United States Patent Office 3,532,716
Patented Oct. 6, 1970

3,532,716
2'-AMINO-[SPIRO-(1,4-BENZODIOXANE-
2,1'-CYCLOPROPANE)]
Joachim Augstein and Alastair M. Monro, Canterbury, and Geoffrey Wilfred Hassey Potter, Ramsgate, England, assignors to Chas. Pfizer & Co., Inc., New York, N.Y., a corporation of Delaware
No Drawing. Original application Mar. 21, 1966, Ser. No. 535,691, now Patent No. 3,413,310, dated Nov. 26, 1968. Divided and this application Mar. 27, 1968, Ser. No. 739,998
Claims priority, application Great Britain, Mar. 26, 1965, 17,886/65
Int. Cl. C07d 15/12
U.S. Cl. 260—340.3        4 Claims This invention relates to new and useful organic compounds in the field of medicinal chemistry, and to novel intermediates for their production. More particularly, it is concerned with certain novel heterocyclic spiro-type compounds that have been found to be useful as therapeutic agents, in view of the interesting biological properties which they possess, and it is also concerned with certain other novel spiro-type intermediates that are useful in preparing these special therapeutic agents.

This application is a division of application Ser. No. 535,691 filed Mar. 21, 1966, now Pat. No. 3,413,310.

The compounds which are included within the purview of the present invention are selected from the class of organic bases of the following general structural formula:

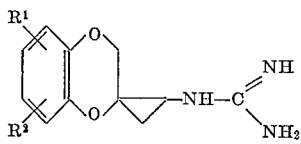

and the pharmaceutically acceptable acid addition salts thereof, wherein $R^1$ and $R^2$ each represent a member selected from the group consisting of hydrogen, chlorine, bromine, and alkyl and alkoxy containing from one to four carbon atoms. Typical of the member compounds of this series are such guanidino-cyclopropanes as 2'-guanidino-[spiro-(1,4-benzodioxane-2,1'-cyclopropane)], and 2' - guanidino-[spiro-(6,7-dimethoxy-1,4-benzodioxane-2,1'-cyclopropane)], including their syn- and anti-forms. The compounds of this invention are of value in the treatment of cardiovascular conditions, with the syn-forms being particularly effective as antihypertensives and as potent adrenergic neurone blocking agents as well.

The process employed for preparing the novel compounds of this invention involves treating an appropriately substituted 2' - amino - [spiro - (1,4-benzodioxane-2,1'-cyclopropane)] with a guanidino-forming reagent by any one of several procedures, including (1) reacting a 2'-amino - [spiro - (1,4-benzodioxane-2,1'-cyclopropane)] salt, such as the hydrochloride, with cyanamide, or fusion reaction of said salt with dicyanamide to form the corresponding 2' - guanidino-[spiro-(1,4-benzodioxane-2,1'-benzodioxane-2,1'-cyclopropane)] salt; (2) reacting the 2' - amino - [spiro-(1,4-benzodioxane-2,1'-cyclopropane)] base compound with a lower S-alkyl isothiouronium salt, such as S-methyl isothiouronium sulfate; (3) reacting said amino base compound with a salt of 1-amidine-3,5-dimethylpyrazole to also form the corresponding 2'-guanidino - [spiro - (1,4 - benzodioxane-2,1'-cyclopropane)] salt, and (4) reacting said amino base compound with a cyanogen halide like cyanogen bromide, followed by treatment of the resulting intermediate N-cyano compound with ammonia to form the corresponding 2'-guanidino - [spiro-(1,4-benzodioxane-2,1'-cyclopropane)] base compound.

The amino base compounds used as starting materials in the foregoing guanidine-forming reactions of this invention are themselves novel compounds of the following general structural formula (wherein $R^1$ and $R^2$ are as previously defined):

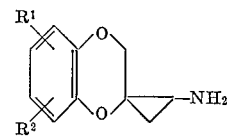

benzodioxane, in which the halogen atom is either chlorine, bromine or iodine, with alcoholic alkali to obtain the corresponding 2-methylene-1,4-benzodioxane compound. The latter compound is then treated with ethyl diazoacetate to yield an epimeric mixture of novel spiro-(1,4-benzodioxane-2,1'-cyclopropane)-2'-carboxylic acid ethyl esters. These esters can be subsequently separated by vapor phase chromatography into the pure epimers themselves, i.e., the cyclopropane compounds and intermediates of this invention exist in syn- and anti- forms by virtue of the spiro-carbon atom which they possess. The separated cyclopropane carboxylic acid esters are then converted to their corresponding carboxylic acids by saponification. Alternatively, the mixture of ester isomers is saponified first and the resulting mixture of epimeric acids is then separated by means of fractional crystallization into their component parts. The separated acids are then subjected to a final series of reaction steps, whereby the acid is first converted to the corresponding azide via a mixed anhydride, and the resulting azide is subjected to a Curtius degradation reaction to form an intermediate isocyanate compound that yields the desired amine on subsequent treatment with either acid or alkali. These last three steps can be illustrated by the following reaction scheme starting from the cyclopropane-carboxylic acid, with R representing the spiro-(1,4-benzodioxane-2,1'-cyclopropane) moiety, viz.,

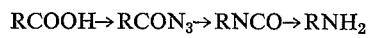
$$RCOOH \rightarrow RCON_3 \rightarrow RNCO \rightarrow RNH_2$$

The preferred method for preparing the final products of this invention from an appropriately substituted 2' - amino[spiro - (1,4-benzodioxane-2,1'-cyclopropane)] salt involves treatment with cyanamide. This particular reaction is normally conducted in a reaction-inert polar solvent medium at a temperature ranging from about 20° C. up to about 120° C. for a period of about four to about 72 hours, and most conveniently at a temperature ranging from between about 60° C. to about 100° C. for from about four to twenty hours. In practice, it is generally most convenient to heat the two reactants together under reflux in the polar solvent, employing substantially equimolar amounts of starting materials. Preferred reaction-inert polar solvents for use in this connection include water, the lower alkanols, such as methanol, ethanol and isopropanol, the N,N-di(lower alkyl) alkanoamides such as N,N-dimethylformamide, N,N- dimethylacetamide, N,N-diethylformamide, N,N-diethylacetamide, N,N-di(n-propyl)formamide and N,N-dimethylpropionamide, and the lower dialkyl sulfoxides and sulfones, such as dimethyl sulfoxide, diethyl sulfone, diisopropyl sulfoxide and di-n-propylsulfone, as well as mixtures thereof.

Upon completion of the reaction, the solvent is removed by means of conventional procedures and the resulting residue taken up in a suitable solvent system, such as one of the aforementioned types, from which it can be subsequently crystallized. Alternatively, the product may separate first from the reaction mixture either during the course of the reaction itself or immediately thereafter, or it may be crystallized from the reaction solution after partial initial concentration of same. A final conversion step to the desired organic base compound can then be effected by neutralising the 2'-guanidino-[spiro-(1,4-benzodioxane-2,1'-cyclopropane)] acid addition salt with aqueous alkali, e.g., dilute aqueous sodium hydroxide. The free organic base compound can then be recovered by extracting the aforesaid aqueous solution with a suitable water-immiscible organic solvent of low volatility, such as a halogenated aliphatic hydrocarbon solvent, e.g., methylene chloride.

Another preferred alternate route involves the reaction of a 2'-amino-[spiro-(1,4-benzodioxane-2,1'-cyclopropane)] compound with a salt of an amidinopyrazole base to form the corresponding 2'-guanidino-[spiro-(1,4-benzodioxane-2,1'-cyclopropane)] salt. The preferred reagent for this reaction is a salt of 1-amidino-3,5-dimethylpyrazole, such as the corresponding sulfate. However, it is also possible to employ other lower 1-amidino-3,5-dialkylpyrazole salts and achieve satisfactory results. This particular process is generally carried out by heating the two reactants together in an aqueous medium of the type previously discussed for the preferred cyanamide method in the absence of any other reagent. Recovery of the desired product from the reaction mixture is then easily effected by evaporation of same under reduced pressure, followed by the subsequent crystallization of the resultant residue from either water or from an aqueous alcohol mixture.

Insofar as the 2'-guanidino-[spiro-(1,4-benzodioxane-2,1'-cyclopropane)] compounds of this invention are basic compounds, they are capable of forming a wide variety of salts with various inorganic and organic acids. Although such salts must be pharmaceutically acceptable for administration to animals, it is possible to first isolate the desired 2'-guanidino-[spiro-(1,4-benzodioxane-2,1'-cyclopropane)] compound from the reaction mixture as a pharmaceutically unacceptable salt and then to subsequently convert the latter, as indicated previously, to the free base compound by treatment with an alkaline reagent, followed by the final conversion to the pharmaceutically acceptable acid salt. For instance, the acid addition salts of the 2'-guanidino-[spiro-(1,4-benzodioxane-2,1'-cyclopropane)] base compounds of this invention may simply be prepared by treating the base compound with a substantially equimolar amount of the chosen acid. The salt-formation step can be carried out in an aqueous solution or in a suitable organic solvent such as methanol or ethanol. Upon careful evaporation of the solvent, the solid salt is obtained.

The acids which are used to prepare the pharmaceutically acceptable acid addition salts of the aforementioned 2'-guanidino-[spiro-(1,4-benzodioxane-2,1'-cyclopropane)] bases of this invention are those which form non-toxic acid addition salts containing pharmaceutically acceptable anions, such as the hydrochloride, hydrobromide, hydriodide, nitrate, sulfate or bisulfate, phosphate or acid phosphate, acetate, lactate, citrate or acid citrate, tartrate or bitartrate, oxalate, succinate, maleate, gluconate saccharate, methanesulfonate, ethanesulfonate, benezensulfonate and p-toluenesulfonate salts.

As previously indicated, the 2'-guanidino-[spiro-(1,4-benzodioxane-2,1'-cyclopropane)] compounds of this invention are therapeutically useful for the treatment of cardiovascular conditions, with the syn-forms being especially active as antihypertensive agents. This is due to the ability of the latter compounds to lower the blood pressure of hypertensive subjects a statistically significant degree. For instance, syn-2'-guanidino-[spiro-(1,4-benzodioxane-2,1'-cyclopropane)] p-toluenesulfonate, a typical and preferred agent of the present invention, has been found to lower the blood pressure of conscious hypertensive rats and dogs a statistically significant degree, via the oral route of administration, without causing any unwanted side effects to occur even when administered for a period of several days. The herein described compounds can be administered to a subject by either the oral or parenteral routes. In general, these compounds are ordinarily administered in dosages ranging from between about 0.15 mg. to about 4.8 mg. per kg. of body weight per day, depending upon the weight and condition of the subject being treated and the particular route of administration chosen.

In connection with the use of the 2'-guanidino-[spiro-(1,4-benzodioxane-2,1'-cyclopropane)] compounds of this invention for the treatment of cardiovascular conditions, it is to be noted that they may be administered either alone or in combination with pharmaceutically acceptable carriers by either of the two routes previously indicated, and that such administration can be carried out in both single and multiple dosages. More particularly, the novel compounds of this invention can be administered in wide variety of different dosage forms, i.e., they may be combined with various pharmecutically acceptable inert carriers in the form of tablets, capsules, lozenges, troches, hard candies, powders, sprays, aqueous suspension, injectable solutions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for such purposes. In general, the therapeutically-effective compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in this connection would also include lactose or milk sugar as well as high molecular weight polyethylene glycols. When aqueous suspensions and/or elixirs are desired for oral administration, the essential active ingredient therein may be combined with various sweetening or flavoring agents, coloring matter or dyes and, if so desired, emulsifying and/or suspending agents as well, together with such diluents as water, ethanol, propylene glycol, glycerin and various combinations thereof.

For purposes of parenteral administration, solutions of these particular 2'-guanidino-[spiro-(1,4-benzodioxane-2,1'-cyclopropanes)] in sesame or peanut oil or in aqueous-propylene glycol or N,N-dimethylformamide may be employed, as well as sterile aqueous solutions of the corresponding water-soluble, non-toxic mineral and organic acid addition salts previously enumerated. Such aqueous solutions should be suitably buffered if necessary and the liquid diluent first rendered isotonic with sufficient saline or glucose. These particular aqueous solutions are especially suitable for intravenous, intramuscular, subcutaneous and intraperitoneal injection purposes. In this connection, the sterile aqueous media employed are readily obtainable by standard techniques well-known to those skilled in the art.

This invention is still further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

EXAMPLE I

To a stirred solution of 46 g. of potassium hydroxide in 95% aqueous ethanol, there were added 100 g. of 2-bromomethyl-1,4-benzodioxane over a period of thirty minutes. Upon completion of this step, the resulting mixture was stirred and refluxed for seven hours, and then cooled to room temperature (~20° C.) and filtered. The filtrate was then concentrated to a small volume while under reduced pressure, water added to the concentrate, and the desired product subsequently isolated therefrom by means of extraction with chloroform and vacuum distillation of the resulting chloroform extract. In this manner, there was obtained a 51.5 g. (80%) yield of 2-methylene-1,4-benzodioxane, B.P. 50° C./0.1 mm. Hg; $n_D^{21.5}=1.563$;

$\lambda_{max.}^{MeOH}$ at 278 and 283 m$\mu$ (where $\epsilon=2255$ and 1990, respectively).

*Analysis.*—Calcd. for $C_9H_8O_2$ (percent): C, 72.96; H, 5.44. Found (percent): C, 72.44; H, 5.61.

A mixture consisting of 47 g. (0.318 mole) of 2-methylene-1,4-benzodioxane and 62 g. (0.32 mole) of ethyl diazoacetate was cooled to 0° C., and then slowly dripped unto 0.50 g. of anhydrous copper sulfate. Nitrogen gas immediately evolved in a vigorous manner and the remaining portions of the mixture were then added at such a rate as to maintain a reaction temperature in the range of 70–80° C. with air-cooling of the flask. Upon completion of this step, the resulting mixture was distilled in vacuo and the product boiling at 120° C./0.013 mm.–180° C./0.07 mm. Hg was collected. In this manner, there was obtained a 44 g. (59%) yield of spiro-(1,4-benzodioxane-2,1'-cyclopropane)-2'-carboxylic acid ethyl ester, which was subsequently shown by vapor phase chromatography and infrared spectroscopy to be a mixture of the two epimeric esters in approximately equal proportions.

The epimeric cyclopropane ester mixture (40 g.), as prepared above, was then added to a solution of 40 g. of sodium hydroxide in 60 ml. of water and the resulting mixture stirred under reflux for two hours. The cooled reaction mixture was then acidified with concentrated hydrochloric acid and the precipitated solids subsequently collected by means of suction filtration to afford spiro - (1,4-benzodioxane-2,1'-cyclopropane) - 2'-carboxylic acid, which after recrystallization from 2.5 liters of water amounted to 17.1 g. (48%) of pale brown crystals melting at 158–162° C. This particular compound is one of a pair of epimeric acid isomers, viz., the anti-form, as revealed by Nuclear Magnetic Resonance studies, wherein the carboxyl group is on the side of the cyclopropane ring opposite to the 3-methylene group in the dioxane ring.

*Analysis.*—Calcd. for $C_{11}H_{10}O_4$ (percent): C, 64.07; H, 4.89. Found (percent): C, 63.50; H, 4.80.

The recystallization liquors obtained above were then evaporated down to a volume of 500 ml., treated with charcoal and allowed to cool. White crystals of the other epimeric acid then formed, which were subsequently collected by means of suction filtration to afford a 5 g. (15%) yield having the following characteristic properties: M.P. 110–113° C.;

$\lambda_{max.}^{MeOH}$ at 278 and 284 m$\mu$ (where $\epsilon=2040$ and 1800, respectively). Nuclear Magnetic Resonance evidence indicated this particular isomer to be the syn-form, wherein the two groups are both on the same side of the cyclopropane ring.

*Analysis.*—Calcd. $C_{11}H_{10}O_4$ (percent): C, 64.07; N, 4.89. Found (percent): C, 64.8; H, 4.76.

An ice-cold solution of the anti-cyclopropane acid (M.P. 158–162° C.) consisting of 3 g. (0.014 mole) of same dissolved in 21 ml. of acetone and 4 ml. of water was treated with 2.2 g. (0.021 mole) of triethylamine and 2.4 g. (0.022 mole) of ethyl chloroformate, each in 7.5 ml. of acetone. After stirring this solution for 30 minutes at 0° C., 1.95 g. (0.030 mole) of sodium azide dissolved in 7 ml. of water were added and the stirring continued at this point for another one-half hour. The reaction mixture was then poured into ice, extracted with diethyl ether and the latter ether extracts subsequently dried over anhydrous sodium sulfate, filtered and concentrated in vacuo to afford a residual oil. The latter residue was then dissolved in 60 ml. of toluene and heated cautiously for one hour at 90° C. until the evolution of nitrogen gas ceased. Benzene (10 ml.) and 10 N KOH (6 ml.) were then added to the mixture, which was thereafter stirred and refluxed for one hour. The product obtained in this manner was then extracted from the organic layer with dilute hydrochloric acid and the free base subsequently liberated therefrom by means of neutralization with caustic soda. This was then followed by the extraction of the said base compound into diethyl ether and the passing of dry hydrogen chloride gas into the ether solution to afford a white solid crystalline deposit consisting of 140 mg. (45% yield) of anti-2'-amino-[spiro-(1,4-benzodioxane-2,1'-cyclopropane)]hydrochloride, M.P. 211–213° C.

*Analysis.*—Calcd. for $C_{10}H_{12}ClNO_2$ (percent): C, 56.60; H, 5.64; N, 6.55; Cl, 16.62. Found (percent): C, 56.66; H, 5.58; N, 7.14; Cl, 16.64.

EXAMPLE II

A solution consisting of 50 g. of the syn-acid prepared in Example I dissolved in 350 ml. of acetone and 70 ml. of water was cooled to 0° C. To this solution, there were then added in a dropwise manner 50 ml. of triethylamine in 100 ml. of acetone, followed by 7 ml. of ethyl chloroformate also in 100 ml. of acetone, with the temperature of the reaction always being maintained below 5° C. throughout the course of the addition. The mixture was then stirred for one hour, after which time 32.5 g. of sodium azide in 125 ml. were added dropwise and the resulting mixture stirred at 0° C. for a further hour. The final reaction mixture was then poured into water, and the intermediate azide isolated by means of extraction with diethyl ether. The combined ether extracts were then dried over anhydrous sodium sulfate, filtered and the resulting filtrate concentrated in vacuo at a temperature below 30° C. The oily residue which was obtained was then stirred in one liter of dry toluene and heated slowly to 85° C., whereupon nitrogen gas immediately evolved from the mixture. The reaction mixture was then kept at 95° C. for two hours thereafterwards, i.e., until nitrogen gas evolution ceased, and after cooling down to 85° C. was treated cautiously with 500 ml. of concentrated hydrochloric acid while stirring the mixture vigorously throughout the addition. Upon completion of this step, the resulting reaction mixture was refluxed for 16 hours, cooled and the aqueous layer separated and then made basic with strong caustic soda solution. After extraction of the basic aqueous solution with diethyl ether, followed by drying over anhydrous sodium sulfate and filtering, there was obtained an anhydrous ethereal filtrate which on treatment with dry hydrogen chloride gas yielded 35 g. of crystalline syn-2'-amino-[spiro-(1,4-benzodioxane-2,1' - cyclopropane)]hydrochloride, M.P. 220–222° C. After one recrystallization from ethanol ether (32 g., 65% yield).

*Analysis.*—Calcd. for $C_{10}H_{12}ClNO_2$ (percent): C, 56.20; H, 5.66; Cl, 16.60; N, 6.55. Found (percent): C, 56.35; H, 5.61; Cl, 16.44; N, 6.14.

EXAMPLE III

Employing the procedure described in Example I, the following anti-2-amino-[spiro-(1,4-benzodioxane-2,1'-cyclopropane)] compounds are prepared (isolated as the hydrochlorides) starting from the appropriate 2-halomethyl-1,4-benzodioxane compounds:

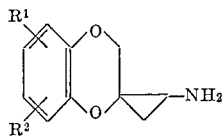

| $R^1$ | $R^2$ |
|---|---|
| 6—Cl | 7—Cl |
| 5—Br | 8—Br |
| 6—$OCH_3$ | 7—$OCH_3$ |
| 5—$OC_3H_7$(iso) | 8—$OC_3H_7$(iso) |
| 6—$C_2H_5$ | 7—$C_2H_5$ |
| 6—Br | 7—Br |
| 5—$CH_3$ | 8—$CH_3$ |
| 5—Cl | 8—Cl |
| 6—$OC_4H_9$(n) | 7—$OC_4H_9$(n) |
| 5—$OC_2H_5$ | 8—$OC_2H_5$ |
| 5—(n—$C_4H_9$) | 8—(n—$C_4H_9$) |
| 6—$CH_3$ | 7—$CH_3$ |

EXAMPLE IV

Following the procedure of Example II, the syn-2'-amino - [spiro - (1,4-benzodioxane-2,1'-cyclopropane)] compounds corresponding to the anti-forms listed in the table of the previous example are also each similarly prepared, starting from the appropriate syn-[spiro-(1,4-benzodioxane-2,1'-cyclopropane)]-2'-carboxylic acid. In each and every case, the corresponding hydrochloride salt of the amine is the product which is actually obtained (i.e., isolated). These compounds all have the following general structural formula, wherein $R^1$ and $R^2$ are exactly the same as previously set forth in the table of Example III:

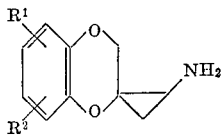

EXAMPLE V

A solution consisting of 15 g. of syn-2'-amino-[spiro-(1,4-benzodioxane-2,1'-cyclopropane)]hydrochloride dissolved in 40 ml. of water was treated with 13.5 g. of p-toluenesulfonic acid hydrate in 30 ml. of water. The resulting mixture was then stirred vigorously, and the precipitated p-toluenesulfonate salt was subsequently collected by means of suction filtration and air-dried. This salt (26 g.) was then refluxed with 29 g. of cyanamide in 100 ml. of 95% ethanol for 16 hours. Upon completion of this step, the resulting reaction solution was concentrated to 50 ml. under reduced pressure and treated with 100 ml. of diethyl ether to give a precipitated solid, which was subsequently collected by means of suction filtration. After one recrystallization from water, there was obtained a 22 g. (80%) yield of syn-2'-guanidino-[spiro-(1,4-benzodioxane-2,1'-cyclopropane)]p - toluene - sulfonate, M.P. 175–177° C.

*Analysis.*—Calcd. for $C_{18}H_{21}N_3O_5S$ (percent): C, 55.23; H, 5.37; N, 10,7. Found (percent): C, 55.09; H, 5.07; N, 10.51.

EXAMPLE VI

A mixture of anti-2'-amino-[spiro-(1,4-benzodioxane-2,1'-cyclopropane]), isolated by treatment of 6.1 g. (0.029 mole) of its hydrochloride (M.P. 211–213° C.) with 5 N sodium hydroxide and subsequent extraction with diethyl ether, in 100 ml. of water containing 5.34 g. (0.014 mole) of 1-amidine-3,5-dimethyl-pyrazole sulfate was heated on a steam bath for five hours. The sulfate product so obtained appeared as an oil on cooling and crystallized with scratching. After recrystallization from water in the presence of charcoal, there was obtained a 1.0 g. (13%) yield of pure product, viz., anti-2'-guanidino-[spiro-(1,4-benzodioxane-2,1' - cyclopropane)] sulfate, M.P. 288–290° C.

*Analysis.*—Calcd. $C_{22}H_{28}N_6O_8S$ (percent): C, 49.25; H, 5.26; N, 15.67; S, 5.96. Found (percent): C, 49.32; H, 5.59; N, 15.58; S, 5.84.

EXAMPLE VII

The procedure described in the previous example was repeated starting with 1.05 g. (0.005 mole) of syn-2'-amino-[spiro-(1,4-benzodioxane-2,1'-cyclopropane)] hydrochloride and using the same molar proportions of reagents as before. In this particular case, the corresponding product obtained, after recrystallization from water, was 0.145 g. (11%) of syn-2' - guanidino - [spiro - (1,4-benzodioxane-2,1'-cyclopropane)] sulfate, M.P. 297–299° C. (decomp.)

*Analysis.* — Calcd. for $C_{22}H_{28}N_6O_8S$ (percent): C, 49.25; H, 5.26; N, 15.67. Found (percent): C, 49.95; H, 5.38; N, 14.40.

EXAMPLE VIII

The procedure described in Example V is repeated employing syn-2'-amino-[spiro - (6,7 - dichloro-1,4 - benzodioxane - 2,1' - cyclopropane)] hydrochloride in place of syn - 2' - amino - [spiro - (1,4 - benzodioxane - 2,1' - cyclopropane)] hydrochloride as the proper starting material, but on the same molar basis as before. In this particular case, the corresponding product obtained is syn-2'-guanidino-[spiro - (6,7 - dichloro - 1,4- - benzodioxane-2,1'-cyclopropane)] p-toluenesulfonate.

In like manner, the use of syn-[spiro-(5,8-dibromo-1,4-benzodioxane-2,1'-cyclopropane)] hydrochloride as starting material in this reaction affords syn-2'-guanidino-[spiro - (5,8- dibromo - 1,4-benzodioxane-2,1'-cyclopropane)] p-toluenesulfonate as the final product which is obtained.

EXAMPLE IX

Ten parts by weight of syn-2'-guanidino-[spiro-(1,4-benzodioxane-2,1'-cyclopropane)] p-toluenesulfonate in 50 parts by volume of water is neutralized with 10 N sodium hydroxide solution. Extraction of the resulting aqueous solution with several portions of methylene chloride, followed by separation of the organic layer and its subsequent concentration under reduced pressure then affords syn-2'-guanidino-[spiro-(1,4-benzodioxane - 2,1'-cyclopropane)] as a free base.

In like manner, when each of the other 2'-guanidino-[spiro-(1,4-benzodioxane-2,1'-cyclopropane)] salts of this invention, like the sulfate and/or p-toluenesulfonate salts reported in Examples VI–VIII, are each individually subjected to this same reaction procedure, the corresponding free organic base compound is always the product obtained.

EXAMPLE X

The following 2'-guanidino-[spiro-(1,4-benzodioxane-2,1'-cyclopropanes)] are prepared in their syn- and anti-forms (other than those previously reported) according to the procedures described in the previous examples from the appropriate starting materials, viz., from the corresponding syn- and anti-2'-amino-[spiro-1,4-benzodioxane- 2,1'-cyclopropanes)] hereinbefore reported in Examples III–IV:

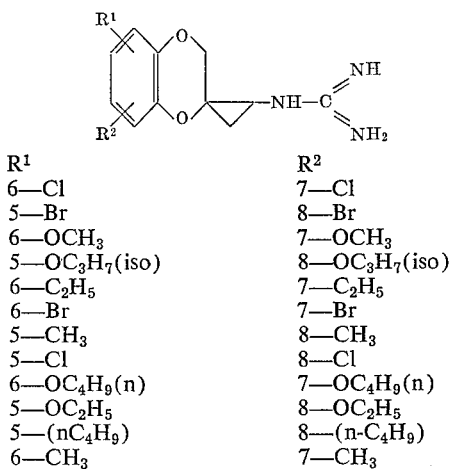

| R¹ | R² |
|---|---|
| 6—Cl | 7—Cl |
| 5—Br | 8—Br |
| 6—OCH₃ | 7—OCH₃ |
| 5—OC₃H₇(iso) | 8—OC₃H₇(iso) |
| 6—C₂H₅ | 7—C₂H₅ |
| 6—Br | 7—Br |
| 5—CH₃ | 8—CH₃ |
| 5—Cl | 8—Cl |
| 6—OC₄H₉(n) | 7—OC₄H₉(n) |
| 5—OC₂H₅ | 8—OC₂H₅ |
| 5—(nC₄H₉) | 8—(n-C₄H₉) |
| 6—CH₃ | 7—CH₃ |

EXAMPLE XI

The non-toxic hydrohalide acid solution salts of each of the syn- and anti-2'-guanidino-[spiro-1,4-benzodioxane-2,1'-cyclopropane)] bases reported previously in Examples IX–X, such as the hydrochloride, hydrobromide and hydriodide salts thereof, are each individually prepared by first dissolving the respective organic base compound in absolute ether followed by introduction of the appropriate hydrogen halide gas into the reaction solution until saturation of same is complete with respect to said gas, whereupon the desired salt precipitates from said solution as a crystalline product. For instance, when syn-2'-guanidino -[spiro-(1,4-benzodioxane-2,1'-cyclopropane)] is dissolved in anhydrous diethyl ether and dry hydrogen chloride gas is subsequently passed into the resulting solution until saturation of same is complete with respect to said gas, there is obtained a crystalline precipitate of syn - 2'-guanidino - [spiro-(1,4-benzodioxane-2,1'-cyclopropane)] hydrochloride.

EXAMPLE XII

The nitrate, sulfate, bisulfate, phosphate, acid phospate, acetate, lactate, citrate, acid citrate, tartate, bitartate, oxalate, succinate, maleate, gluconate, saccharate, methane sulfonate, ethanesulfonate, benzenesulfonate and p-toluenesulfonate salts of each of the aforementioned syn- and anti - 2' - guanidino - [spiro-(1,4-benzodioxane-2,1'-cyclopropane)] bases previously reported in Examples IX–X are all prepared by separately dissolving in a suitable amount of ethanol the proper molar amounts of the respective acid and the appropriate organic base compound and then mixing two solutions together, followed by the addition of diethyl ether to the resulting reaction solution in order to effect precipitation of the desired acid addition salt therefrom. For instance when equimolar amounts of syn - 2' - guanidino - [spiro-(6,7-dichloro-1,4-benzodioxane-2,1'-cyclopropane)] and concentrated sulfuric acid react in accordance with this procedure, the corresponding product obtained in syn-2'-guanidino-[spiro - (6,7 - dichloro - 1,4 - benzodioxane-2,1'-cyclopropane)] sulfate.

What is claimed is
1. A 2'-amino-[spiro-(1,4-benzodioxane-2,1'-cyclopropane)] compound of the formula:

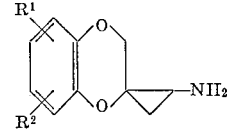

wherein R¹ and R² each represent a member selected from the group consisting of hydrogen, chlorine, bromine, and alkyl and alkoxy containing from one to four carbon atoms.

2. A compound as claimed in claim 1 wherein R¹ and R² are each hydrogen.
3. The syn-form of the compound as claimed in claim 2.
4. The anti-form of the compound as claimed in claim 2.

References Cited

FOREIGN PATENTS 1,073,657   6/1967   Great Britain.

ALEX MAZEL, Primary Examiner

J. H. TURNIPSEED, Assistant Examiner

U.S. Cl. X.R.

424—278